US012505525B2

United States Patent
He et al.

(10) Patent No.: US 12,505,525 B2
(45) Date of Patent: Dec. 23, 2025

(54) TUNNEL DEFECT DETECTING METHOD AND SYSTEM USING UNMANNED AERIAL VEHICLE

(71) Applicant: Tongji University, Shanghai (CN)

(72) Inventors: Bin He, Shanghai (CN); Gang Li, Shanghai (CN); Runjie Shen, Shanghai (CN); Zhongpan Zhu, Shanghai (CN); Zhipeng Wang, Shanghai (CN); Jie Chen, Shanghai (CN); Xudong Wang, Shanghai (CN)

(73) Assignee: Tongji University, Shanghai (CN)

( * ) Notice: Subject to any disclaimer, the term of this patent is extended or adjusted under 35 U.S.C. 154(b) by 998 days.

(21) Appl. No.: 17/580,935

(22) Filed: Jan. 21, 2022

(65) Prior Publication Data

US 2022/0383484 A1 Dec. 1, 2022

(30) Foreign Application Priority Data

May 25, 2021 (CN) .......................... 202110572574.6

(51) Int. Cl.
*G06T 7/00* (2017.01)
*G01M 5/00* (2006.01)
(Continued)

(52) U.S. Cl.
CPC ......... *G06T 7/0004* (2013.01); *G01M 5/0033* (2013.01); *G01M 5/0075* (2013.01);
(Continued)

(58) Field of Classification Search
CPC .................................................. G06T 7/0004
See application file for complete search history.

(56) References Cited

U.S. PATENT DOCUMENTS

| 11,002,859 | B1 * | 5/2021 | Zhang | ................... G01S 19/393 |
| 2010/0079385 | A1 * | 4/2010 | Holmgren | ............. G06F 3/0425 |
| | | | | 345/173 |

(Continued)

FOREIGN PATENT DOCUMENTS

| CN | 112113978 A | * | 12/2020 |
| CN | 112130579 A | * | 12/2020 |

(Continued)

OTHER PUBLICATIONS

Sirigool et al. "Particle Filter for Hector SLAM to Improve the Performance of Robot Positioning by Image Processing," 2020, International Journal of Machine Learning and Computing, vol. 10, No. 3, pp. 490-491 (Year: 2020).*

*Primary Examiner* — Andrew Schechter
*Assistant Examiner* — Brandon George Macgregor

(57) ABSTRACT

Tunnel defect detecting method and system using unmanned aerial vehicle (UAV) are provided, and the UAV is equipped with a light-emitting diode (LED) module, a camera, a laser radar, an ultrasonic distance meter and an inertial measurement unit (IMU). The method includes: collecting images in a tunnel based on the LED module and the camera to obtain a training image set; training by using the training image set to obtain a defect detecting model, collecting real-time tunnel images, detecting suspected defects to the real-time tunnel images by the defect detecting model, obtaining pose information of the UAV based on the camera, the laser radar, the ultrasonic distance meter and the IMU to control the UAV to hover. The method can realize accurate pose estimation and defect detection in the tunnel with no GPS signals and highly symmetrical inside.

6 Claims, 2 Drawing Sheets

(51) Int. Cl.
*G05D 1/00* (2024.01)
*G06T 5/70* (2024.01)
*G06T 5/92* (2024.01)
*G06T 7/20* (2017.01)
*G06T 7/70* (2017.01)

(52) U.S. Cl.
CPC .......... *G01M 5/0091* (2013.01); *G05D 1/101*
(2013.01); *G06T 5/70* (2024.01); *G06T 5/92*
(2024.01); *G06T 7/20* (2013.01); *G06T 7/70*
(2017.01); *G06T 2207/20081* (2013.01); *G06T 2207/20084* (2013.01)

(56) References Cited

U.S. PATENT DOCUMENTS

| | | | |
|---|---|---|---|
| 2015/0103148 A1* | 4/2015 | Masuda | H04N 13/239 348/47 |
| 2016/0350907 A1* | 12/2016 | Simula | B60R 11/04 |
| 2018/0290748 A1* | 10/2018 | Corban | G06T 19/006 |
| 2020/0064483 A1* | 2/2020 | Li | G01S 13/867 |
| 2020/0334836 A1* | 10/2020 | Lin | G06T 7/74 |

FOREIGN PATENT DOCUMENTS

| | | | | |
|---|---|---|---|---|
| CN | 112180954 A | * | 1/2021 | ........... G05D 1/0808 |
| KR | 20170100789 A | * | 9/2017 | |
| WO | WO-2020168284 A1 | * | 8/2020 | ........... G02B 21/365 |

* cited by examiner

TUNNEL DEFECT DETECTING METHOD AND SYSTEM USING UNMANNED AERIAL VEHICLE

TECHNICAL FIELD

The invention relates to the field of unmanned aerial vehicle patrol inspection, and particularly to a tunnel defect detecting method and a system using an unmanned aerial vehicle (UAV).

BACKGROUND

In recent years, China's infrastructure facilities, such as underground subway tunnels, railway tunnels, and tunnels of express highways, have entered the "aged" period after long-term service, so maintenance and inspections for the facilities are required regularly; otherwise disastrous consequences will be caused. However, the conventional maintenance needs a lot of manpower and material resources, and there are many problems such as heavy workloads, high risks and bad working environment. Therefore, it is urgent to use unmanned aerial vehicles (UAVs) to maintain facilities. UAV is flexible and agile, and can easily get to places inaccessible to people.

In the prior art, the UAV flies autonomously during patrol inspection, and uses GPS signals to locate and update the position information of UAV in real-time manner. When UAV finds a suspected target area, it will hover in the area for further precise operation, and return the hovering position information and operation results to the upper computer, so as to facilitate subsequent field survey by staff or provide reference for staffs.

However, when detecting tunnel defects, the collected images are often of low quality because of the dim light in the tunnel and even dark areas. Moreover, GPS (Global Positioning System) technology can't be used in the tunnel, and the positioning errors of UAV are accumulated with the passage of time. Because the tunnel has a highly symmetrical structure, there are almost no other geometric features and textures, which also brings challenges to the pose estimation of UAV in multiple degrees of freedom. Due to the lack of positioning accuracy, there is also a big error in the returned location information after the tunnel defects are found based on images. Therefore, the existing technology cannot meet the requirements of tunnel defect detection.

SUMMARY

The objective of the invention is to provide a tunnel defect detecting method and a system using unmanned aerial vehicle to overcome the defects in the prior art. The UAV according to the invention uses LED (light-emitting diode) module to supplement the illumination in the tunnel, integrates IMU (Inertial Measurement Unit), camera, laser radar and ultrasonic distance meter to realize the pose estimation of the UAV, uses the trained defect detecting model to detect whether there is a suspected defect in a real-time manner, controls the UAV hovers after finding the suspected defect and further detects the defect, and can realize accurate pose estimation and defect detection in the tunnel with no GPS signals and highly symmetrical inside.

The objective of the invention can be achieved by the following technical scheme.

A tunnel defect detecting method using UAV, the UAV is equipped with a LED module, a camera, a laser radar, an ultrasonic distance meter and an IMU; the tunnel defect detecting method using the UAV includes the following steps:

S1, mounting the LED module and the camera on the UAV, using the LED module to supplement the illumination in the tunnel, collecting a plurality of original images of tunnel defects in the tunnel based on the LED module and the camera to obtain an original image set, and pre-processing the original image set to obtain a training image set;

S2, constructing a neural network model, and training the neural network model by using the training image set to obtain a defect detecting model;

S3, acquiring the pose information of the UAV based on the camera, the laser radar, the ultrasonic distance meter and the IMU, collecting real-time tunnel images based on the LED module and the camera while the UAV is flying in the tunnel, and using the defect detecting model to detect suspected defects in the real-time tunnel images; if the suspected defects are detected, executing S4; otherwise, continuing the flight of the UAV, and repeating S3; and S4, making the UAV to hover, collecting the suspected defect images based on the LED module and the camera, and using the defect detecting model to detect defects of the suspected defect images, recording the position information of the UAV and defect detection results, and then continuing the flight of the UAV, and executing S3.

Further, the pre-processing of the original image set includes the following steps: when the LED module is used for extra illumination supplement, the jitter of the UAV in flight will lead to problems such as uneven brightness, blurred details and noise in the collected images; therefore, denoising and enhancing the original images of the original image set to improve the image quality, and then marking the defect types of the original images to obtain a training image set.

Furthermore, the defect types include a crack defect and a spalling defect; the crack defect refers to linear crack on the tunnel surface, and the spalling defect refers to depression on the tunnel surface after concrete falls off.

Furthermore, in S1, the original image set is subjected to data enhancement before denoising and enhancing the original images in the original image set; the data enhancement specifically includes performing flipping, contrast and brightness adjustment and image random cropping of image samples in the original image set, and adding the images obtained by data enhancement to the original image set.

Further, without the help of GPS signals, accurate position estimation is needed to realize the accurate hovering of the UAV, and the positioning cannot be realized in the tunnel environment with repeated structure, high symmetry and self-similarity only by laser radar. In the application, obtaining the pose information of the UAV based on the camera, the laser radar, the ultrasonic distance meter and the IMU specifically includes:

acquiring the UAV motion information measured by IMU, and obtaining the first position information of the UAV based on the UAV motion information;

obtaining the UAV flight images collected by the camera being a binocular camera; after pre-processing the UAV flight images, using the optical flow method to track the feature points to solve the second position information of the UAV;

acquiring radar point cloud data collected by the laser radar, building a 2D SLAM (two-dimensional simultaneous localization and mapping) in real-time, and matching the currently acquired radar point cloud data with the real-time map, so as to solve the third position information of the UAV;

obtaining the absolute height information of the UAV based on ultrasonic distance meter measurement;

and taking the first position information as the predicted values, the second position information, the third position information and the absolute height information as the observed values, and fusing the information to obtain the pose information of the UAV.

Furthermore, unscented Kalman filter (UKF) algorithm is used to fuse the first position information, the second position information, the third position information and the absolute height information to obtain the pose information of the UAV.

Further, in S3 and S4, the operation of the UAV in flight also includes obstacle avoidance control, in which the speed of the UAV is changed according to the current speed of the UAV and the distance between the UAV and the obstacle based on the artificial potential field method.

A tunnel defect detecting system using UAV includes:

the UAV, which is equipped with the LED module, the camera, the laser radar, the ultrasonic distance meter and the IMU;

a position calculator, which obtains the pose information of the UAV based on the camera, the laser radar, the ultrasonic distance meter and the IMU;

a defect detector, which detects suspected defects and defects based on the real-time tunnel images collected by the LED module and the camera and the defect detecting model;

a flight controller, which controls the flight and hovering of the UAV based on the pose information of the UAV during flight and the suspected defect detection results of the defect detector.

Further, the flight controller also carries out obstacle avoidance control during the flight of the UAV; in the obstacle avoidance control, based on the artificial potential field method, the speed of the UAV is changed according to the current speed of the UAV and the distance between the UAV and the obstacle.

Further, the tunnel defect detecting system also includes an upper computer and a communicator; the communicator is mounted on the unmanned aerial vehicle, and the upper computer is in communication connection with the tunnel defect detecting system using UAV through the communicator.

Compared with the prior art, the invention has the following beneficial effects.

(1) The UAV according to invention uses LED module to supplement the illumination in the tunnel, integrates IMU, camera, laser radar and ultrasonic distance meter to realize the pose estimation of the UAV, uses the trained defect detecting model to detect whether there is a suspected defect in real-time, controls the UAV hovers after finding the suspected defect and further detects the defect, and can realize accurate pose estimation and defect detection in the tunnel with no GPS signals and highly symmetrical inside.

(2) The original images of tunnel defects are collected manually, and the images are enhanced and denoised to improve the image quality. The diversity of samples is expanded through the data enhancement, thus improving the detection accuracy and robustness of the defect detecting model.

(3) Laser radar can't locate in the tunnel environment with repeated structure, high symmetry and self-similarity. In this application, the first position information based on IMU, the second position information based on camera, the third position information based on the laser radar and the height information based on ultrasonic distance meter are fused by UKF algorithm to obtain the pose information of UAV, and the position estimation of the UAV in the tunnel environment is realized.

DETAILED DESCRIPTION OF THE EMBODIMENTS

The invention will be described in detail below with reference to the drawings and specific embodiments. The embodiment is implemented on the premise of the technical scheme of the invention, and gives detailed implementation and specific operation process. However, the protection scope of the invention is not limited to the following embodiments.

Embodiment 1

In this embodiment, the unmanned aerial vehicle (UAV) for tunnel defect detection is a multi-rotor UAV, which is equipped with a LED module, a camera, a laser radar, an ultrasonic distance meter and an inertial measurement unit (IMU); the LED module is used to supplement the illumination in the tunnel, so that the camera can collect images at a certain brightness; the radar point cloud data collected by the laser radar can realize the positioning and obstacle avoidance of the UAV; the camera collects tunnel images for defect detection, and it can also be used as a visual odometer to estimate the pose information of the UAV; and the ultrasonic distance meter is used to obtain the height information of the UAV.

Figure 1:
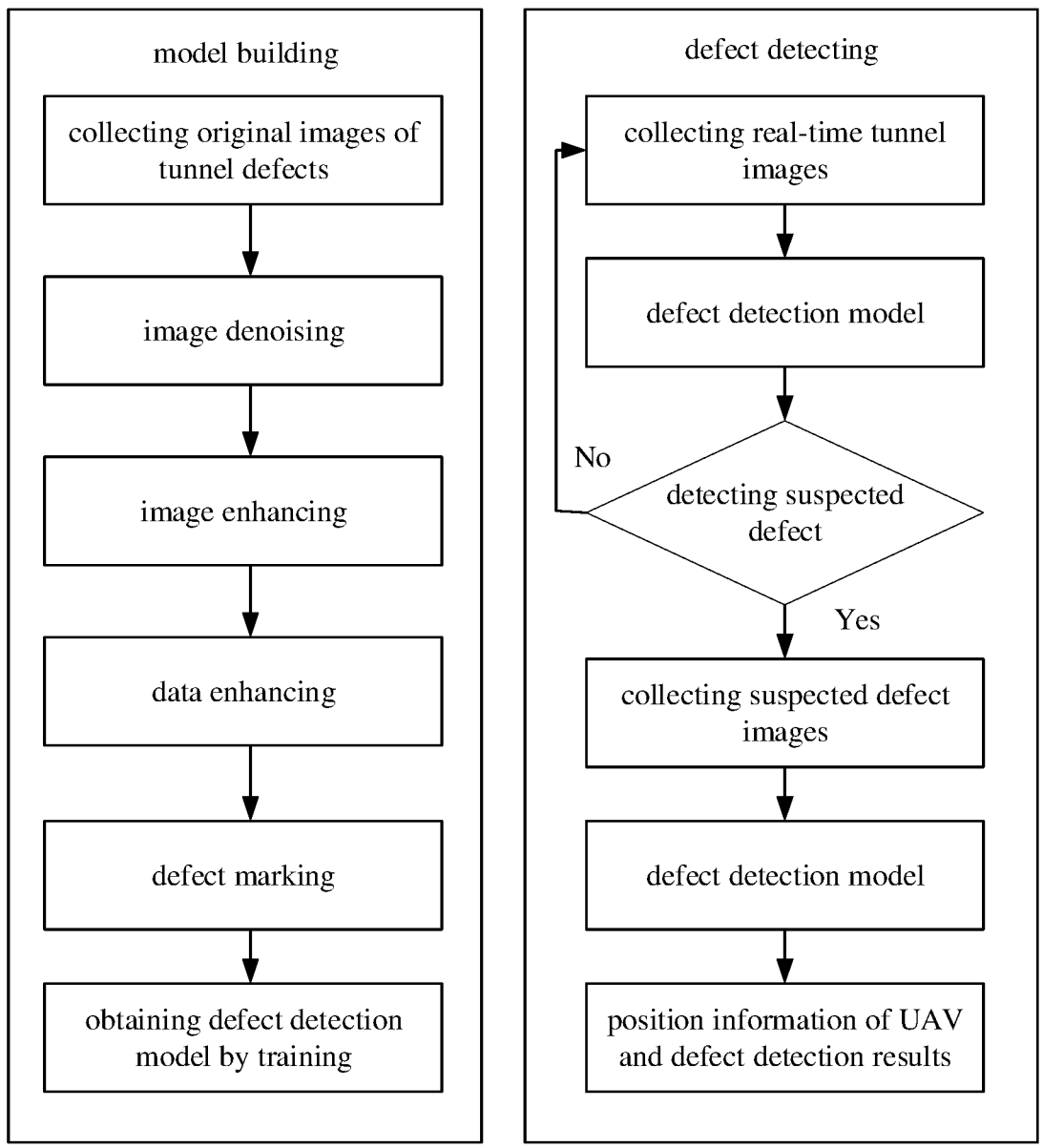
FIG. 1 is a flow chart of the tunnel defect detection method using an UAV.

A tunnel defect detecting method using UAV, as shown in FIG. 1, includes the following steps:

S1, mounting the LED module and the camera on the UAV, collecting a plurality of original images of tunnel defects in a tunnel based on the LED module and the camera to obtain an original image set, and pre-processing the original image set to obtain a training image set;

S2, constructing a neural network model, and training the neural network model by the training image set to obtain a defect detecting model;

S3, acquiring the pose information of the UAV based on the camera, the laser radar, the ultrasonic distance meter and the IMU, collecting real-time tunnel images based on the LED module and the camera while the UAV is flying in the tunnel, and using the defect detecting model to detect suspected defects in the real-time tunnel images; if the suspected defects are detected, executing S4, otherwise, continuing the flight of the UAV, and repeating S3; and S4, making the UAV to hover, collecting the suspected defect images based on the LED module and the camera, and using the defect detecting model to detect defects of the suspected defect images to obtain a defect detection result, recording the position information of the UAV and the defect detection result and then continuing the flight of the UAV, and executing S3.

In a word, the method includes two stages, the first stage is the defect detecting model building stage, and the second stage is the defect detecting stage.

In the defect detecting model building stage, the UAV can be manually controlled to fly in the tunnel; when the UAV flies, the camera collects the images of the tunnel, and the staff observes the images; if the staff finds defects on the images, the staff will control the UAV to hover and collect multiple original images of tunnel defects containing the defects, and then continue to control the UAV to fly and repeat the above process to obtain an original image set.

Defect types include a crack defect and a spalling defect; the crack defect refers to linear crack on the tunnel surface, the spalling defect refers to a similar round or oval depression left after the hardened concrete on the tunnel surface falls off.

When the LED module is used for extra illumination supplement, the jitter of the UAV in flight will lead to problems such as uneven brightness, blurred details and noise in the collected images. Therefore, the original images in the original image set are subjected to denoising and image enhancement processing, such as contrast stretching, to improve the image quality, and then the defect types of each original image are marked to obtain the training image set.

Because the number of original images collected may be small, the training image set can be expanded by data enhancement. The original image set is subjected to data enhancement before the denoising and the image enhancement processing. The data enhancement specifically includes performing flipping, contrast and brightness adjustment and image random cropping to image samples in the original image set, and adding the images obtained by data enhancement to the original image set.

After that, the neural network can be constructed by CNN (Convolutional Neural Networks) convolutional neural network, or by other neural network structures, and the training based on the training image set. When the recognition accuracy reaches the expected threshold, the trained defect detecting model can be obtained.

In this embodiment, the defect detecting model is stored in the minicomputer NUC (Next Unit of Computing) mounted on the UAV, and the defect detecting model building stage is completed.

In the defect detection stage, the UAV flies autonomously in the tunnel, and uses the defect detecting model to detect defects in the real-time tunnel images collected during the flight; if a suspected defect is detected, the UAV is controlled to hover at the suspected defect position to collect images with higher quality, and then detects defects based on the defect detecting model again.

Figure 2:
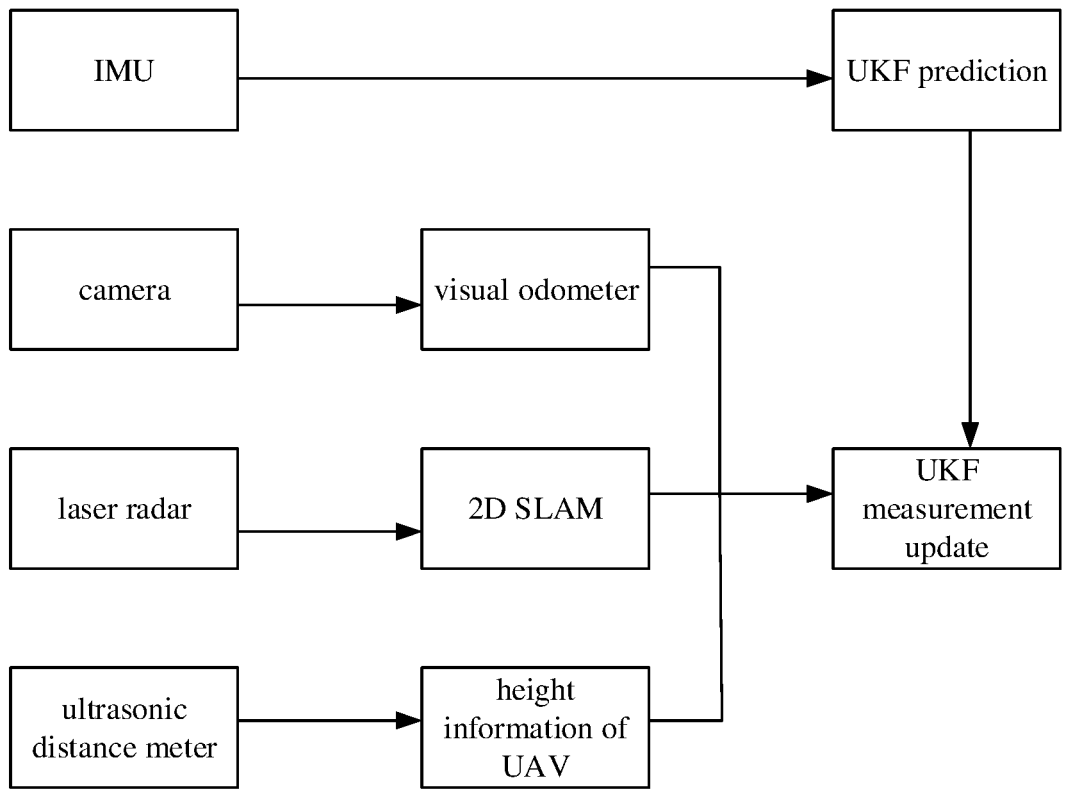
FIG. 2 is a flow chart for determining the pose information of the UAV.

Without the help of GPS signals, accurate position estimation is needed to realize the accurate hovering of the UAV, and the positioning cannot be realized in the tunnel environment with repeated structure, high symmetry and self-similarity only by laser radar. As shown in FIG. 2, in the application, obtaining the pose information of the UAV based on the camera, the laser radar, the ultrasonic distance meter and the IMU is specifically as follows.

Acquiring the UAV motion information measured by the IMU, and obtaining the first position information of the UAV based on the UAV motion information;

Obtain the acceleration and angular acceleration information $[a_t^t, w_t^b]$ of the UAV with the IMU, and the coordinate system of the information is UAV coordinate system; based on the state propagation model of the IMU, the position, speed and angle information of the UAV can be obtained at every moment as follows:

$$\begin{cases} u_t = [a_t^t, w_t^b]^T \\ v_t = [{}^a v_t, {}^a v_t]^T \\ [P_{t+1}^w, \dot{P}_{t+1}^b, \phi_{t+1}^w] = f(P_t^w, \dot{P}_t^b, \phi_t^w, u_t, v_t) \end{cases};$$

where, $P_t^w$ represents the three-dimensional position of the UAV in the world coordinate system at time t, $\dot{P}_t^b$ represents the three-dimensional speed of the UAV in the UVA coordinate system, $\emptyset_t^w$ is the three-dimensional angle (yaw, pitch and roll angle) of the UAV in the world coordinate system, $v_t$ represents the noise information of the IMU, and $f(\cdot)$ represents the discrete form of kinematics equation.

obtaining the UAV flight images collected by the binocular camera; after pre-processing the UAV flight images, using the optical flow method to track the feature points, and solving the second position information of the UAV; the camera is the binocular camera;

the binocular camera acquires flight images with a frame rate of 30 FPS; the binocular camera acquires left and right images during the UAV flight as follows: firstly, using histogram to equalize and enhance the image contrast of the two images, and using the adaptive threshold method to segment the images to obtain the black-and-white images; then, detecting the Fast feature points of the black-and-white images, tracking the feature points by using KLT (Kanade-Lucas-Tomasi Tracking) optical flow, eliminate the wrong tracking points by using RANSAC (Random Sample Consensus) algorithm, and tracking the optical flow of the left and right images to obtain the depth of feature points as follows:

$$\text{depth} = \frac{Bf_x}{d};$$

where, B represents the baseline length of left and right cameras, $f_x$ represents the focal length and d represents the parallax;

when a certain number of images are obtained, PnP (perspective-n-point) algorithm is used to solve the features of adjacent moments to obtain the pose information $[x^w, y^w, \text{depth}]$ of the UAV.

Acquiring radar point cloud data collected by the laser radar, building the 2D SLAM in real-time, and matching the currently acquired radar point cloud data with the real-time map, so as to solve the third position information of the UAV;

scanning the surrounding environment by the laser radar, build the 2D SLAM in real-time, using Hector-SLAM algorithm when the original data of the laser radar matches the map currently built, using Gauss-Newton method to obtain the most probable pose of the UAV in the map at that moment as follows:

$$\xi^* = \operatorname{argmin}_\xi \Sigma_{i=1}^n [1 - M(S_i(\xi))]^2;$$

where, $\xi = (x, y, \theta)^T$ represents the pose information, $S_i(\xi)$ represents the representation of endpoint coordinates of the laser radar in the world coordinate system, and $M(S_i(\xi))$ represents the map value of the coordinate point $S_i(\xi)$.

Obtaining the absolute height information of the UAV based on measurement of the ultrasonic distance meter;

take the first position information as the predicted value, the second position information, the third position information and the absolute height information as the observed values, update the predicted value by using unscented Kalman filter (UKF) algorithm, and finally obtaining the fused pose information of the UAV, $X_t=[p_t^w, \dot{P}_t^b, \emptyset_t^w, w_t^b]$.

The operation of UAV in flight also includes obstacle avoidance control, in which the speed of the UAV is changed according to the current speed of the UAV and the distance between the UAV and the obstacle based on the artificial potential field method. During the flight, based on the obstacle information scanned by the laser radar, it is assumed that the obstacle is a positive charge, and the UAV is also a positive charge, so the repulsion force will be generated between the UAV and the obstacle, and the closer the distance is, the greater the repulsion force. The repulsion force can be expressed by the square of the distance between the current position of the UAV and the obstacle. When the UAV approaches an obstacle, the speed of the UAV will be reduced, so that the distance between the UAV and the obstacle will not be too close, thus achieving obstacle avoidance control.

Figure 3:
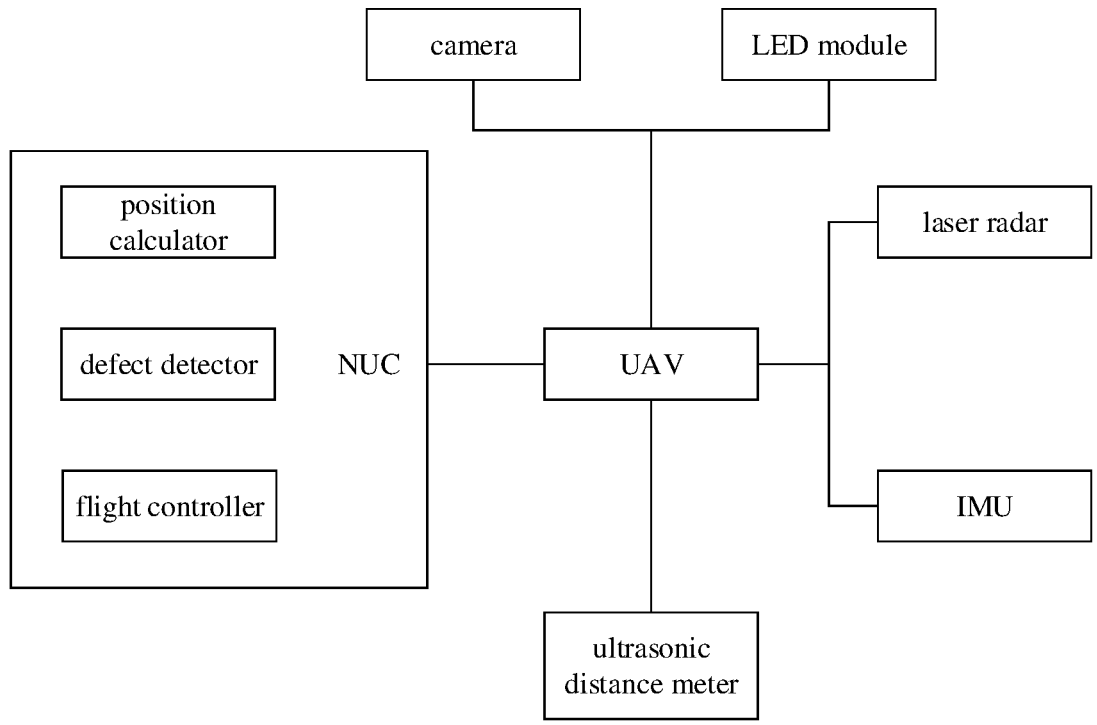
FIG. 3 is a block diagram of the tunnel defect detecting system using an UAV.

The application also provides a tunnel defect detecting system using UAV, as shown in FIG. 3, which includes:

the UAV, which is equipped with the LED module, the camera, the laser radar, the ultrasonic distance meter and the IMU;

a position calculator, which obtains the pose information of the UAV based on the camera, the laser radar, the ultrasonic distance meter and the IMU;

a defect detector, which detects suspected defects and defects based on real-time tunnel images collected by the LED module and the camera and the defect detecting model;

a flight controller, which controls the flight and hovering of the UAV based on the pose information of the UAV during flight and the suspected defect detection results of the defect detector.

It is worth mentioning that, in some embodiments, the position calculator, the defect detector and the flight controller are embodied by at least one processor and at least one memory coupled to the at least one processor, and the at least one memory stores programs executable by the at least one processor.

The flight controller also carries out obstacle avoidance control during the flight of the UAV. In the obstacle avoidance control, based on the artificial potential field method, the speed of the UAV is changed according to the current speed of the UAV and the distance between the UAV and obstacle.

The defect detecting system also includes an upper computer (also referred to as host computer) and a communicator, and the communicator is mounted on the UAV, and the upper computer is in communication connection with the tunnel defect detecting system using UAV through the communicator.

Specifically, when the UAV performs the tunnel defect detecting task, the upper computer is the staffs computer. The UAV is equipped with a minicomputer NUC (abbreviation for Next Unit of Computing), in which the defect detecting model is stored, and the position calculator (also referred to as position calculating module), the defect detector (also referred to as defect identifying module) and the flight controller (also referred to as flight control module) are all integrated in the NUC. The communicator (for example, wireless communication module) can realize the real-time communication connection between the UAV and the upper computer. The staff can receive the defect detecting information, position information, position and pose information of the UAV, etc., and can also send control instructions to the UAV.

The preferred embodiments of the invention have been described in detail above.

It should be understood that those skilled in the art can make many modifications and changes according to the concept of the invention without creative efforts. Therefore, all technical solutions that can be obtained by the technicians in the technical field through logical analysis, reasoning or limited experiments based on the existing technology according to the concept of the invention should be within the scope of protection determined by the claims.

What is claimed is:

1. A tunnel defect detecting method using an unmanned aerial vehicle (UAV), wherein the UAV is equipped with a light-emitting diode (LED) module, a camera, a laser radar, an ultrasonic distance meter and an inertial measurement unit (IMU); and the tunnel defect detecting method comprises:

S1, collecting a plurality of original images of tunnel defects in a tunnel based on the LED module and the camera to obtain an original image set, and pre-processing the original image set to obtain a training image set;

S2, constructing a neural network model, and training the neural network model by using the training image set to obtain a defect detecting model;

S3, acquiring pose information of the UAV based on the camera, the laser radar, the ultrasonic distance meter and the IMU, collecting real-time tunnel images based on the LED module and the camera while the UAV is flying in the tunnel, and detecting suspected defects in the real-time tunnel images by using the defect detecting model; wherein if the suspected defects are detected, executing S4; otherwise, continuing the flying of the UAV, and repeating S3; and S4, making the UAV to hover, collecting suspected defect images based on the LED module and the camera, using the defect detecting model to detect defects of the suspected defect images to obtain a defect detection result, recording position information of the UAV and the defect detection result, and then continuing the flying of the UAV, and executing S3;

the acquiring pose information of the UAV based on the camera, the laser radar, the ultrasonic distance meter and the IMU, comprises:

obtaining UAV motion information measured by the IMU, and obtaining first position information of the UAV based on the UAV motion information;

obtaining UAV flight images collected by the camera being a binocular camera, pre-processing the UAV flight images to obtain pre-processed UAV flight images and then performing feature point tracking onto the pre-processed UAV flight images by an optical flow method to solve second position information of the UAV;

wherein the binocular camera acquires left and right images during the UAV flight as follows: firstly, using histogram to equalize and enhance the image contrast of the two images, and using the adaptive threshold method to segment the images to obtain the black-and-white images; then, detecting the Fast feature points of the black-and-white images, tracking the feature points by using KLT (Kanade-Lucas-Tomasi Tracking) optical flow, eliminate the wrong tracking points by using RANSAC (Random Sample Consensus) algorithm, and tracking the optical flow of the left and right images to obtain the depth of feature points as follows:

depth=$Bf_x/d$;

wherein, B represents the baseline length of left and right cameras, $f_x$ represents the focal length and d represents the parallax;

obtaining radar point cloud data collected by the laser radar, and obtaining third position information of the UAV based on the radar point cloud data;

scanning the surrounding environment by the laser radar, build the 2D SLAM in real-time, using Hector-SLAM algorithm when the original data of the laser radar matches the map currently built, using Gauss-Newton method to obtain the most probable pose of the UAV in the map at that moment as follows:

$\xi^* = \mathrm{argmin}_\xi \Sigma_{i=1}^n [1-M(S_i(\xi))]^2$;

wherein, $\xi=(x, y, \theta)^T$ represents the pose information, $S_i(\xi)$ represents the representation of endpoint coordinates of the laser radar in the world coordinate system, and $M(S_i(\xi))$ represents the map value of the coordinate point $S_i(\xi)$;

obtaining absolute height information of the UAV based on measurement of the ultrasonic distance meter; and taking the first position information as predicted values, taking the second position information, the third position information and the absolute height information as observed values, and fusing the predicted values and the observed values to obtain the pose information of the UAV;

wherein obtaining the acceleration and angular acceleration information $[\alpha_t^t, w_t^b]$ of the UAV with the IMU, and the coordinate system of the information is UAV coordinate system; based on the state propagation model of the IMU, the position, speed and angle information of the UAV can be obtained at every moment as follows:

$$\begin{cases} u_t = [a_t^t, w_t^b]^T \\ v_t = [{}^a v_t, {}^a v_t]^T \\ [P_{t+1}^w, \dot{P}_{t+1}^b, \varnothing_{t+1}^w] = f(P_t^w, \dot{P}_t^b, \varnothing_t^w, u_t, v_t) \end{cases};$$

wherein, $P_t^w$ represents the three-dimensional position of the UAV in the world coordinate system at time t, $\dot{P}_t^b$ represents the three-dimensional speed of the UAV in the UVA coordinate system, $\varnothing_t^w$ Lis the three-dimensional angle of the UAV in the world coordinate system, $v_t$ represents the noise information of the IMU, and $f(\cdot)$ represents the discrete form of kinematics equation;

wherein the first position information, the second position information, the third position information and the absolute height information are fused by using an unscented Kalman filter (UKF) algorithm to obtain the pose information of the UAV;

in the S3 and the S4, the flying of the UAV further comprises:

performing obstacle avoidance control;

wherein the performing obstacle avoidance control, comprises: changing a speed of the UAV according to a current speed of the UAV and a distance between the UAV and an obstacle based on an artificial potential field method.

2. The tunnel defect detecting method using the UAV according to claim 1, wherein the pre-processing the original image set to obtain a training image set, comprises:

denoising and enhancing the original images in the original image set, and marking defect types of the original images to obtain the training image set.

3. The tunnel defect detecting method using the UAV according to claim 2, wherein the defect types comprise a crack defect and a spalling defect, the crack defect refers to a linear crack on a tunnel surface, and the spalling defect refers to a depression on the tunnel surface after concrete falls off.

4. The tunnel defect detecting method using the UAV according to claim 2, wherein in S1, the original image set is subjected to data enhancement before the denoising and enhancing the original images in the original image set; the data enhancement comprises: performing flipping, contrast and brightness adjustment and image random cropping to image samples in the original image set, and adding images obtained by the data enhancement to the original image set.

5. A tunnel defect detecting system based on the tunnel defect detecting method using the UAV according to claim 1, and wherein the tunnel defect detecting system comprises:

the UAV, being equipped with the LED module, the camera, the laser radar, the ultrasonic distance meter and the IMU;

a position calculator, configured to obtain the pose information of the UAV based on the camera, the laser radar, the ultrasonic distance meter and the IMU;

a defect detector, configured to detect the suspected defects and the defects based on the real-time tunnel images collected by the LED module and the camera and the defect detecting model; and a flight controller, configured to control the flying and the hovering of the UAV based on the pose information of the UAV during the flying and suspected defect detection results of the defect detector.

6. The tunnel defect detecting system according to claim 5, wherein the flight controller is further configured to perform obstacle avoidance control during the flying of the UAV; wherein the obstacle avoidance control comprises: based on an artificial potential field method, a speed of the UAV is changed according to a current speed of the UAV and a distance between the UAV and an obstacle.

\* \* \* \* \*